(12) United States Patent
Siebourg et al.

(10) Patent No.: US 6,639,000 B2
(45) Date of Patent: Oct. 28, 2003

(54) ABS MOLDING COMPOSITIONS HAVING IMPROVED PROCESSABILITY

(75) Inventors: Wolfgang Siebourg, Bonn (DE); Edgar Leitz, Dormagen (DE); Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 30 days.

(21) Appl. No.: 09/955,890

(22) Filed: Sep. 18, 2001

(65) Prior Publication Data

US 2002/0082326 A1 Jun. 27, 2002

(30) Foreign Application Priority Data

Sep. 21, 2000  (DE) .......................... 100 46 773

(51) Int. Cl.$^7$ ................................. C08K 5/20
(52) U.S. Cl. ................. 524/232; 524/231; 524/504; 525/64; 525/316; 525/233
(58) Field of Search ................ 524/232, 231, 524/504; 525/316, 64, 233

(56) References Cited

U.S. PATENT DOCUMENTS

| | | | | |
|---|---|---|---|---|
| 4,070,327 A | * | 1/1978 | Junger et al. | ................ 524/292 |
| 5,321,078 A | * | 6/1994 | Mashita et al. | ................ 525/64 |
| 5,393,801 A | * | 2/1995 | Nakamura et al. | ............. 522/79 |
| 6,090,889 A | * | 7/2000 | De Loor et al. | .............. 525/94 |

FOREIGN PATENT DOCUMENTS

| | | |
|---|---|---|
| EP | 0869147 A1 * | 10/1998 |
| WO | 97/16481 | 5/1997 |
| WO | 99/06349 | 2/1999 |

OTHER PUBLICATIONS

Arendt Et Al: "New Benzoate Plasticizers for Latex Adhesives" Adhesives Age, Atlanta, GA, US, Bd. 41, Nr. 3, Mar. 1, 1998, Seiten 36–39, XP002084308 das ganze dokument.

* cited by examiner

Primary Examiner—David W. Wu
Assistant Examiner—Henry S Hu
(74) Attorney, Agent, or Firm—Joseph C. Gil; Aron Preis

(57) ABSTRACT

An additive mixture containing a dibenzoate and either or both of a compound containing at least one structural unit

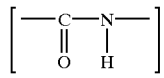

and a compound containing at least one structural unit

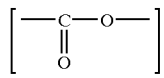

is disclosed. The additive combination enhances the processability of a thermoplastic molding composition that contains a (co)polymer of styrene, methyl methacrylate, acrylonitrile, methacrylonitrile, maleic anhydride and N-substituted maleimide and a graft copolymer.

13 Claims, No Drawings

ABS MOLDING COMPOSITIONS HAVING IMPROVED PROCESSABILITY

FIELD OF THE INVENTION

The present invention relates to compositions containing matrix polymer, graft polymer and special additive combinations, to the use thereof in the production of molded bodies, and to molded bodies obtainable therefrom. The invention relates also to the additive combination itself.

SUMMARY OF THE INVENTION

An additive mixture containing a dibenzoate and either or both of a compound containing at least one structural unit

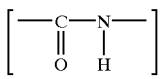

and a compound containing at least one structural unit

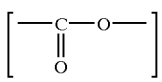

is disclosed. The additive combination enhances the processability of a thermoplastic molding composition that contains a (co)polymer of styrene, methyl methacrylate, acrylonitrile, methacrylonitrile, maleic anhydride and N-substituted maleimide and a graft copolymer.

BACKGROUND OF THE INVENTION

ABS molding compositions have already been used for many years in large amounts as thermoplastic resins for the production of moldings of all kinds. The spectrum of properties of such resins ranges from relatively brittle to very tough.

A specific field of use of ABS molding compositions is the production of moldings by injection molding (e.g. casings, toys, motor vehicle parts), where very good flowability of the polymer material is particularly important. In addition, the moldings so produced must generally exhibit good notched impact strength.

The object is to make available ABS molding compositions that have very good thermoplastic flowability while maintaining good toughness values, those properties being achieved without changing the polymeric repeating units that are used. The conventionally employed method of increasing the amount of processing aid used generally leads to losses in terms of other properties as well as to a marked rise in costs.

DETAILED DESCRIPTION OF THE INVENTION

It has now been found that, by using special additive mixtures, it is possible to obtain ABS molding compositions that have very good thermoplastic processability while maintaining good toughness values.

The invention provides thermoplastic molding materials (or compositions) containing A) from 5 to 95 wt. %, preferably from 10 to 90 wt. % and especially from 20 to 75 wt. %, of one or more thermoplastic homo-, co- or ter-polymers of styrene, α-methylstyrene, styrene substituted at the nucleus, methyl methacrylate, acrylonitrile, methacrylonitrile, maleic anhydride, N-substituted maleimide or mixtures thereof, B) from 5 to 95 wt. %, preferably from 10 to 90 wt. % and especially from 25 to 80 wt. %, of one or more graft polymers of
B.1) from 5 to 90 parts by weight, preferably from 20 to 80 parts by weight and especially from 25 to 60 parts by weight, of styrene, α-methylstyrene, styrene substituted at the nucleus, methyl methacrylate, acrylonitrile, methacrylonitrile, maleic anhydride, N-substituted maleimide or mixtures thereof, with
B.2) from 95 to 10 parts by weight, preferably from 80 to 20 parts by weight and especially from 75 to 40 parts by weight, of at least one rubber having a glass transition temperature <10° C. and C) from 0.5 to 10 parts by weight, preferably from 1 to 8 parts by weight and especially from 1.5 to 6 parts by weight (in each case per 100 parts by weight of A) +B)) of a mixture of a) at least one dibenzoate of di- or tri-alkylene glycols and at least one of b) and c) wherein b) is at least one compound containing at least one structural unit

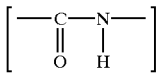

and c) is at least one compound containing at least one structural unit

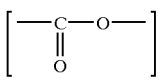

Preferably, each of the compounds b) and c) contains at least one terminal aliphatic $C_6$–$C_{32}$ hydrocarbon radical.

Thermoplastic polymers A) suitable according to the invention are polymers of styrene, α-methylstyrene, p-methylstyrene, vinyltoluene, halostyrene, methyl acrylate, methyl methacrylate, acrylonitrile, maleic anhydride, N-substituted maleimide or mixtures thereof.

The polymers A) are resinous, thermoplastic and rubber-free. Especially preferred polymers A) are polymers of styrene, methyl methacryl ate, styrene/acrylonitrile mixtures, styrene/acrylonitrile/methyl methacrylate mixtures, styrene/methyl methacrylate mixtures, acrylonitrile/methyl methacrylate mixtures, α-methylstyrene/acrylonitrile mixtures, styrene/α-methylstyrene/acrylonitrile mixtures, α-methylstyrerene/methyl methacrylate/acrylon itrile mixtures, styrene/α-methylstyrene/methyl methacrylate mixtures, styrene/α-methylstyrene/methyl methacrylate/acrylonitrile mixtures, styrene/maleic anhydride mixtures, methyl methacrylate/maleic anhydride mixtures, styrene/methyl methacrylate/maleic anhydride mixtures.

The polymers A) are known and can be prepared by free-radical polymerization, especially by emulsion, suspension, solution or mass polymerization. They preferably have molecular weights $\overline{M}_w$ of from 20,000 to 200,000 and intrinsic viscosities [η] of from 20 to 110 ml/g (measured in dimethylformamide at 25° C.).

Rubbers suitable for the preparation of the graft polymers B) are especially polybutadiene, butadiene/styrene copolymers, butadiene/acrylonitrile copolymers, polyisoprene, or alkyl acrylate rubbers based on $C_1$–$C_8$-alkyl acrylates, especially ethyl, butyl, ethylhexyl acrylate.

The acrylate rubbers may optionally contain copolymerized therein up to 30 wt. % (based on the weight of the rubber) of monomers such as vinyl acetate, acrylonitrile, styrene, methyl methacrylate and/or vinyl ether. The acrylate rubbers may also contain polymerized therein small amounts, preferably up to 5 wt. % (based on weight of the rubber) of ethylenically unsaturated monomers having a crosslinking action. Crosslinking agents are, for example, alkylenediol diacrylates and methacrylates, polyester diacrylates and methacrylates, divinylbenzene, trivinylbenzene, triallyl cyanurate, allyl acrylate and methacrylate, butadiene and isoprene. Graft bases may also be acrylate rubbers having a core/shell structure with a core such as of crosslinked diene rubber of one or more conjugated dienes, such as polybutadiene, or a copolymer of a conjugated diene with an ethylenically unsaturated monomer such as styrene and/or acrylonitrile.

Further suitable rubbers are, for example, the so-called EPDM rubbers (polymers of ethylene, propylene and a non-conjugated diene such as, for example, dicyclopentadiene), EPM rubbers (ethylene/propylene rubbers) and silicone rubbers, which may optionally also have a core/shell structure.

Preferred rubbers for the preparation of the graft polymers B) are diene rubbers and alkyl acrylate rubbers as well as EPDM rubbers.

The rubbers are present in the graft polymer B) are preferably in the form of at least partly crosslinked particles having a mean particle diameter ($d_{50}$) of from 0.05 to 20 µm, preferably from 0.1 to 2 µm and especially from 0.1 to 0.8 µm. The mean particle diameter $d_{50}$ may be determined by ultracentrifuge measurements according to W. Scholtan et al., Kolloid-Z. u. Z. Polymere 250 (1972), 782–796 or by evaluation of electron microscope images. The degree of crosslinking is limited so as to retain the thermoplasticity of the rubber.

The polymers B) may be prepared by free-radical graft polymerization of the monomers B.1) in the presence of the rubbers B.2) onto which they are to be grafted.

Preferred preparation processes for the graft polymers B) are emulsion, solution, mass or suspension polymerization and combinations, known per se, of such processes. Especially preferred graft polymers B) are ABS polymers.

Very especially preferred polymers B) are products that have been obtained by free-radical polymerization of mixtures of styrene and acrylonitrile, preferably in a weight ratio of from 10:1 to 1:1, especially in a weight ratio of from 5:1 to 2:1, in the presence of a rubber that is composed of predominantly diene monomers (preferably polybutadiene, which may contain up to 30 wt. % styrene and/or acrylonitrile as comonomers) and that has a mean particle diameter ($d_{50}$) of from 100 to 450 nm, very especially preferably in the presence of two rubbers that are composed of predominantly diene monomers (preferably polybutadiene, which may contain up to 30 wt. % styrene and/or acrylonitrile as comonomers) and that have a) a mean particle diameter ($d_{50}$) of from 150 to 300 nm and b) a mean particle diameter ($d_{50}$) of from 350 to 450 nm, in a weight ratio (a):(b)=from 10:90 to 90:10, preferably from 30:70 to 60:40.

The rubber content of the polymers B) is preferably from 40 to 95 wt. %, especially from 50 to 90 wt. % and very especially from 55 to 85 wt. %.

Suitable individual components of the additive mixture C) are, for example and preferably:

As component a): diethylene glycol dibenzoate, triethylene glycol dibenzoate, dipropylene glycol dibenzoate, tripropylene glycol dibenzoate; special preference is given to mixtures selected from those compounds.

As component b): ethylenediaminebisstearylamide, erucic acid amide, oleic acid amide, stearic acid amide, behenic acid amide, montanic acid amide; preference is given to ethylenediaminebisstearylamide and/or erucic acid amide, and special preference is given to ethylenediaminebisstearylamide.

As component c): glycerol tristearate, glycerol trioleate, glycerol tribehenate, glycerol trimontanate, stearyl stearate, stearyl oleate, stearyl behenate, stearyl montanate, oleyl stearate, oleyl oleate, oleyl behenate, oleyl montanate, behenyl stearate, behenyl oleate, behenyl behenate, behenyl montanate, octyl stearate, isooctyl stearate, dodecyl stearate, dodecyl oleate, glycerol monostearate, glycerol distearate, glycerol monooleate, glycerol dioleate, pentaerythritol tetrastearate, pentaerythritol tetraoleate, pentaerythritol tetrabehenate, pentaerythritol tetramontanate, pentaerythritol tristearate, pentaerythritol trioleate, pentaerythritol tribehenate, pentaerythritol trimontanate, pentaerythritol distearate, pentaerythritol dioleate, pentaerythritol dibehenate, pentaerythritol dimontanate, pentaerythritol monostearate, pentaerythritol monooleate, pentaerythritol monobehenate, pentaerythritol monomontanate; preference is given to glycerol tristearate, stearyl stearate or pentaerythritol tetrastearate, and special preference is given to glycerol tristearate or pentaerythritol tetrastearate or in each case mixtures thereof.

The molding compositions according to the invention may additionally contain further additive components that aid processability.

Examples of such compounds are metal-containing long-chained substances such as, for example and preferably, magnesium stearate, calcium stearate, zinc stearate, magnesium montanate, calcium montanate, zinc montanate, magnesium behenate, calcium behenate, zinc behenate, magnesium oleate, calcium oleate, zinc oleate; preference is given to magnesium stearate or calcium stearate, and special preference is given to magnesium stearate or other long-chained substances such as, for example and preferably, paraffin oils, hydrocarbon waxes, low molecular weight polystyrene prepared using $C_8$–$C_{18}$-alkylmercaptans as molecular-weight regulator having mean molecular weights ($\overline{M}_w$) of from 2000 to 15,000, preferably from 2500 to 12,000 and especially from 3000 to 10,000, low molecular weight styrene/acrylonitrile copolymer prepared using $C_8$–$C_{18}$-alkylmercaptans as molecular-weight regulator having mean molecular weights ($\overline{M}_w$) of from 2000 to 15,000, preferably from 2500 to 12,000 and especially from 3000 to 10,000, low molecular weight α-methylstyrene/acrylonitrile copolymer prepared using $C_8$–$C_{18}$-alkylmercaptans as molecular-weight regulator having mean molecular weights ($\overline{M}_w$) of from 2000 to 15,000, preferably from 2500 to 12,000 and especially from 3000 to 10,000, low molecular weight polymethyl methacrylate prepared using $C_8$–$C_{18}$-alkylmercaptans as molecular-weight regulator having mean molecular weights ($\overline{M}_W$) of from 2000 to 15,000, preferably from 2500 to 12,000 and especially from 3000 to 10,000, $C_6$–$C_{32}$-alkanols, for example and preferably stearyl alcohol, $C_6$–$C_{32}$-alkenols, for example and preferably oleyl alcohol.

Preference is given to paraffin oils, low molecular weight styrene/acrylonitrile copolymers or α-methylstyrene/acrylonitrile copolymers, and special preference is given to paraffin oils or low molecular weight styrene/acrylonitrile copolymers, or in each case mixtures thereof.

The weight ratios in the case of the use according to the invention of components a) and b) and/or c) in the additive component C) are (a):(b) or (a):(b+c) or (a):(c)=from 10:1 to 1:5, preferably from 8:1 to 1:4 and especially from 5:1 to 1:2.

Especially preferred mixtures consist of from 15 to 65 wt. % of graft polymer consisting of from 25 to 60 parts by weight of styrene, α-methylstyrene, acrylonitrile, N-phenylmaleimide or mixtures thereof, with from 75 to 40 parts by weight of polybutadiene, which may contain up to 30 wt. % styrene and/or acrylonitrile as comonomers, from 85 to 35 wt. % of thermoplastic copolymer consisting of from 5 to 40 parts by weight of acrylonitrile and from 95 to 60 parts by weight of styrene, α-methylstyrene, N-phenylmaleimide or mixtures thereof, and from 1.5 to 6 parts by weight per 100 parts by weight of A+B of a combination of a) a mixture of diethylene glycol dibenzoate, triethylene glycol dibenzoate and dipropylene glycol dibenzoate, b) ethylenediaminebisstearylamide and/or c) pentaerythritol tetrastearate or glycerol stearate.

The mixtures according to the invention containing A), B) and C) and, optionally, conventional additives such as processing agents, stabilizers, pigments, antistatics, fillers, are prepared by mixing the respective constituents in a known manner either simultaneously or in succession at room temperature or at elevated temperature, and then melt-compounding or melt-extruding the mixture at temperatures of from 150° C. to 300° C. in conventional apparatuses such as internal kneaders, extruders or double-shaft screws.

The molding compositions of the present invention may be used in the production of molded bodies of any kind, wherein conventional production methods may be employed; molded bodies can be produced especially by injection molding.

A further form of processing the molding compositions according to the invention is the production of molded bodies by deep-drawing from sheets or films produced previously by known processes.

Accordingly, the present invention relates to a process for the preparation of the compositions, to the use thereof in the production of molded bodies, and to the molded bodies obtainable therefrom. The present invention relates also to the additive combination itself.

eter ($d_{50}$) of 290 nm and b) a mean particle diameter ($d_{50}$) of 420 nm. Working up by coagulation of the latex with magnesium sulfate, washing with water and subsequent drying in vacuo.

Graft Polymer B2

Graft product obtained by emulsion polymerization of 50 wt. % of a styrene/acrylonitrile mixture (weight ratio 73:27) with 50 wt. % of particulate polybutadiene having a mean particle diameter ($d_{50}$) of 130 nm. Working up as under B1.

Additive Ca: Benzoflex® 2088 (mixture of 50 wt. % diethylene glycol dibenzoate, 25 wt. % triethylene glycol dibenzoate and 25 wt. % dipropylene glycol dibenzoate (Velsicol, Rosemont, Ill., USA)

Additive Cb: Ethylenediaminebisstearylamide (Henkel KG, Dusseldorf, Germany) Additive Cc: Pentaerythritol tetrastearate (Henkel KG, Dusseldorf, Germany)

The individual components are compounded in the amounts by weight indicated in Table 1 together with 0.5 part by weight magnesium stearate and 0.15 part by weight of a silicone oil in a 1.3 liter internal kneader at temperatures of from 160° C. to 200° C. The molded bodies are produced on an injection-molding machine at 240° C.

The notched bar impact strength is determined at room temperature ($a_k^{RT}$) and at −30°- C ($a_k^{-30° C.}$) according to ISO 180/1A (unit: kJ/m²), and evaluation of the thermoplastic flowability is carried out by measuring the melt flow index (MVR) according to DIN 53 735 U (unit: cm³/10 min.).

As will also be seen from Table 1, a very good combination of good toughness and excellent thermoplastic processability is achieved only when the mixtures according to the invention are used.

TABLE 1

Compositions and test data of the molding compositions

| Example No. | A parts by wt. | B1 parts by wt. | B2 parts by wt. | Ca parts by wt. | Cb parts by wt. | Cc parts by wt. | $a_k^{RT}$ (kJ/m²) | $a_k^{-30° C.}$ (kJ/m²) | MVR (cm³/10 min.) |
|---|---|---|---|---|---|---|---|---|---|
| 1 | 75 | 12.5 | 12.5 | 1 | 1 | — | 14 | 8 | 38 |
| 2 | 75 | 12.5 | 12.5 | 2 | 1 | — | 13 | 8 | 45 |
| 3 | 75 | 12.5 | 12.5 | 2 | — | 1 | 17 | 8 | 39 |
| 4 | 75 | 12.5 | 12.5 | 1 | 2 | — | 15 | 7 | 45 |
| 5 | 75 | 12.5 | 12.5 | 2 | 2 | — | 14 | 7 | 53 |
| 6 | 75 | 12.5 | 12.5 | 3 | 2 | — | 14 | 6 | 62 |
| 7 (comp.) | 75 | 12.5 | 12.5 | 1 | — | — | 13 | 8 | 30 |
| 8 (comp.) | 75 | 12.5 | 12.5 | 2 | — | — | 13 | 8 | 34 |
| 9 (comp.) | 75 | 12.5 | 12.5 | — | 1 | — | 14 | 8 | 27 |
| 10 (comp.) | 75 | 12.5 | 12.5 | — | 2 | — | 14 | 7 | 35 |
| 11 (comp.) | 75 | 12.5 | 12.5 | — | — | 1 | 17 | 9 | 27 |
| 12 (comp.) | 75 | 12.5 | 12.5 | — | — | — | 14 | 8 | 25 |

The invention is further illustrated but is not intended to be limited by the following examples in which all parts and percentages are by weight unless otherwise specified.

EXAMPLES

Thermoplastic resin A1

Random styrene/acrylonitrile (72:28) copolymer having a $\overline{M}_w$ of approximately 85,000, determined by GPC (gel permeation chromatography).

Graft Polymer B1

Graft product obtained by emulsion polymerization of 42 wt. % of a styrene/acrylonitrile mixture (weight ratio 73:27) with 58 wt. % of a 1:1 mixture (weight ratio) of two particulate polybutadienes having a) a mean particle diam- Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising

A) from 5 to 95 wt. % of one or more thermoplastic (co)polymer of at least one member selected from the group consisting of styrene, α-methylstyrene, styrene substituted at the nucleus, methyl methacrylate, acrylonitrile, methacrylonitrile, maleic anhydride and N-substituted maleimide, B) from 5 to 95 wt. % of one or more graft polymers of
  B.1) from 5 to 90 parts by weight of at least one member selected from the group consisting of styrene, a-methylstyrene, styrene substituted at the nucleus, methyl methacrylate, acrylonitrile, methacrylonitrile, maleic anhydride and N-substituted maleimide, with
  B.2) from 95 to 10 parts by weight of at least one rubber having a glass transition temperature $\leq 10°$ and
C) from 0.5 to 10 parts by weight (per 100 parts by weight of A)+B)) of a mixture of a) at least one dibenzoate of di- or tri-alkylene glycols and at least one of b) and c) wherein b) is at least one compound containing at least one structural unit

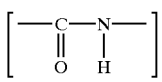

and c) is at least one compound containing at least one structural unit

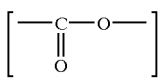

2. The composition according to claim 1, wherein each of the compounds b) and c) contains at least one terminal $C_6$–$C_{32}$ hydrocarbon radical.

3. The composition according to claim 1, wherein compound a) is a member selected from the group consisting of diethylene glycol dibenzoate, triethylene glycol dibenzoate, dipropylene glycol dibenzoate, and tripropylene glycol dibenzoate.

4. The composition according to claim 1, wherein compound b) is a member selected from the group consisting of ethylenediamine-bisstearylamide, erucic acid amide, oleic acid amide, stearic acid amide, behenic acid amide and montanic acid amide.

5. The composition according to claim 1, wherein compound c) is a member selected from the group consisting of glycerol tristearate, glycerol trioleate, glycerol tribehenate, glycerol trimontanate, stearyl stearate, stearyl oleate, stearyl behenate, stearyl montanate, oleyl stearate, oleyl oleate, oleyl behenate, oleyl montanate, behenyl stearate, behenyl oleate, behenyl behenate, behenyl montanate, octyl stearate, isooctyl stearate, dodecyl stearate, dodecyl oleate, glycerol monostearate, glycerol distearate, glycerol monooleate, glycerol dioleate, pentaerythritol tetrastearate, pentaerythritol tetraoleate, pentaerythritol tetrabehenate, pentaerythritol tetramontanate, pentaerythritol tristearate, pentaerythritol trioleate, pentaerythritol tribehenate, pentaerythritol trimontanate, pentaerythritol distearate, pentaerythritol dioleate, pentaerythritol dibehenate, pentaerythritol dimontanate, pentaerythritol monostearate, pentaerythritol monooleate, pentaerythritol monobehenate and pentaerythritol monomontanate.

6. The composition according to claim 1, wherein compound a) is a member selected from the group consisting of
  diethylene glycol dibenzoate, triethylene glycol dibenzoate,
  dipropylene glycol dibenzoate and tripropylene glycol dibenzoate compound b) is a member selected from the group consisting of
  ethylenediaminebisstearylamide and erucic acid amide, and compound c) is a member selected from the group consisting of
  glycerol stearate, stearyl stearate and pentaerythritol tetrastearate.

7. The Composition according to claim 1 wherein components a), b) and c) are present in the composition at weight ratios of (a):(b), (a):(b+c) and (a):(c) of 10:1 to 1:5.

8. The composition according to claim 1 wherein C) is present in an amount of 1.5 to 6 parts by weight per 100 parts by weight of A+B.

9. The composition according to claim 1 wherein component B.2 is selected from the group consisting of diene rubber and alkyl acrylate rubber.

10. The composition according to claim 1 further containing at least one member selected from the group consisting of processing aid, stabilizer, pigment, antistatic agent and filler.

11. A method of using the composition of claim 1 comprising molding an article.

12. A molded article comprising the composition of claim 1.

13. A mixture comprising a) at least one dibenzoate of di- or tri-alkylene glycols and at least one of b) and c) wherein b) is at least one compound containing at least one structural unit

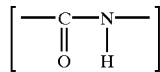

and c) is at least one compound containing at least one structural unit

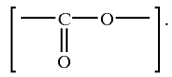

* * * * *